3,406,162
DYE SALTS OF ANIONIC METAL COMPLEX DYES OF THE BENZENEAZOACETOACETYL ALKYL AMIDE SERIES AND ORGANIC AMINE NITROGEN BASES
Reinhard Neier, Basel, Switzerland, assignor to Sandoz Ltd. (also known as Sandoz A.G.), Basel, Switzerland
No Drawing. Filed Jan. 12, 1966, Ser. No. 520,057
Claims priority, application Switzerland, Jan. 15, 1965, 600/65
23 Claims. (Cl. 260—145)

ABSTRACT OF THE DISCLOSURE

Anionic metal complex dye/nitrogen base salts, the dye of which is a benzene-azo-acetoacetyl-alkyl amide dye, have good solubility in organic solvents. Polymers colored with the dye salts have excellent fastness properties.

This invention relates to dye salts from an anionic metal complex dye of the benezene-azo-acetoacetyl-alkyl amide series and a nitrogen base and a process for their production.

The anionic metal complex dye is based upon a metal-free dye of the formula $$R_1-A(R_2)-N=N-CH(CO-CH_3)(CO-NH-R_3) \quad (I)$$

where:
$R_1$ represents a carboxylic or sulphonic acid group,
$R_2$ represents a substituent capable of metal complex formation, and
$R_3$ represents a substituted or unsubstituted alkyl radical, preferably an alkyl radical having at least 5 or, more particularly, 6 to 14 carbon atoms. The nucleus A may bear further, non-dissociating substituents.

This dye (I) may be employed as a 1:1 complex, for example with chromium, copper or nickel as metal atom, or as a 1:2 complex, for example with chromium or cobalt as metal atom.

The process for the production of the new dye salts comprises reacting one mole of an anionic metal complex dye of the benzene-azo-acetoacetyl-alkylamide series with 1 mole of a nitrogen base. Especially suitable dye salts are obtained when a 1:2 metal-complex dye of 1 mole of a dye of Formula I and 1 mole of another metallizable azo dye and 1 atom of chromium or cobalt, or, when a 1:2 metal complex dye of 2 moles of a dye of Formula I and 1 atom of chromium or cobalt is reacted with a nitrogen base.

The following "asymmetric" 1:2 metal complex dyes are especially suitable, for example those of the formula $$\left[ \begin{array}{c} R_1 \\ R_4-X \\ N \\ \parallel \\ N \\ R_5-Y \end{array} \xrightarrow{} Me \xleftarrow{} \begin{array}{c} A \\ O- \\ N \\ \parallel \\ N \\ O-C=C \\ CH_3 \end{array} \begin{array}{c} \\ \\ R_3 \\ CO-N \\ H \end{array} \right]^{\ominus} H^{\oplus} \quad (III)$$

where:
X represents —O— or —COO—,
Y represents —O—, —COO—, —NH— o r
—N—
 |
 R
where:
R stands for a substituted or unsubstituted alkyl or aryl radical, such as a phenyl or naphthyl radical,
$R_4$ stands for the radical of a diazo compound having a metallizable group in ortho position to the azo group,
$R_5$ stands for the radical of a coupling component having a metallizable group in adjacent position to the azo group, and
Me stands for a metal atom, for example a chromium or cobalt atom, the ring A may bear further substituents, for example chlorine, bromine, fluorine, nitro, cyano, trifluoromethyl, alkyl radicals having 1 to 5 carbon atoms, alkoxy radicals having 1 to 5 carbon atoms, low molecular alkylsulphonyl, phenyl or low molecular alkanoylamino. In Formula III each alkyl (other than for $R_3$) and the alkyl of each alkoxy substituent may be lower alkyl.

Illustrative dyes (III) are the "asymmetrical" 1:2 cobalt complex dyes of formula $$\left[ \begin{array}{c} R_8 \; R_9 \\ R_7 \end{array} \begin{array}{c} -O \\ N \\ \parallel \\ N \\ C=C \\ H_3C-C \\ N-N \\ R_{10} \end{array} \xrightarrow{} Co \xleftarrow{} \begin{array}{c} O \\ O \\ C=C-CO \\ CH_3 \; NH-R_3 \end{array} \begin{array}{c} COOH \\ A \\ -R_6 \end{array} \right]^{\ominus} H^{\oplus} \quad (V)$$

where:
$R_6$ represents hydrogen, substituted or unsubstituted alkyl, chlorine, bromine or nitro,
$R_7$ represents hydrogen, substituted or unsubstituted alkyl or alkoxy, chlorine, bromine or nitro,
$R_8$ represents hydrogen or nitro,
$R_9$ represents hydrogen, substituted or unsubstituted alkyl, chlorine or bromine, and
$R_{10}$ represents hydrogen, substituted or unsubstituted alkyl or aryl such as phenyl, naphthyl or tetrahydronaphthyl.

The 1:1 complexes have the formula $$R_1-A-N=N-C(CO-N(R_3)H) \cdots O-Me-O-C-CH_3$$

while the "symmetric" 1:2 metal complex dyes used for the production of the dye salts are of the formula $$\left[ \left( \begin{array}{c} R_1 \\ A \\ N \\ \parallel \\ N \\ C=C-O \\ CH_3 \\ R_3 \\ CO-N \\ H \end{array} -O- \right)_2 Me \right]^{\ominus} H^{\oplus} \quad (IV)$$

where Me represents a metal atom, preferably a chromium or cobalt atom.

Examples of other metallizable azo dyes are those of the benzene-azo-benzene, benzene-azo-naphthalene, benzene - azo-pyrazolone, benzene-azo-aminopyrazole, benzene-azo-acetoacetylamide and naphthalene-azo-naphthalene series, all of which bear groups capable of metal complex formation, in particular carboxyl, amino and hydroxyl groups in ortho, ortho' position to the azo group. Dyes of this description are described, for example, in the following patents:

United States Patent 3,040,019, filed on Dec. 11, 1959; Swiss Patents 303,283, filed on Mar. 26, 1952; 316,751, filed on May 22, 1953; 316,752, filed on July 3, 1953; 316,754, filed on July 7, 1953; 339,684, filed on Dec. 23, 1955; 353,103, filed on Mar. 15, 1957; 353,107, filed on Feb. 1, 1957; German Patents 535,472, filed on July 5, 1927; 704,541, filed on Oct. 27, 1935; 709,631, filed on Mar. 19, 1937; 715,082, filed on Aug. 20, 1938; 715,948, filed on Dec. 13, 1938; 723,292, filed on Mar. 19, 1937; 742,939, filed on Dec. 28, 1938; 745,334, filed on Mar. 22, 1942; 745,458, filed on May 20, 1942; 955,800, filed on May 9, 1954; 1,011,396, filed on Dec. 29, 1955; 1,044,023, filed on Dec. 14, 1955.

The nitrogen bases used as starting materials are organic amines which may be colorless or colored. For example, primary or secondary aliphatic amines having at least 4 or preferably 10 to 18 carbon atoms can be used, or alternatively basic dyes containing, for example, hydrazinium, ammonium, cycloimmonium or aminoxide groups, such as the dyes of the acridine, auramine, rhodamine, malachite green and triphenylmethane series.

Compounds containing a hydrazinium group are disclosed, for example, in French Patent 1,325,176, filed on Apr. 20, 1962; in French patent of addition 81,967 to French Patent 1,325,176, filed on Apr. 21, 1962; and in Belgian Patents 630,895, filed on Apr. 10, 1963; 633,447, filed on June 10, 1963; 638,438, filed on Oct. 9, 1963; 639,981, filed on Nov. 14, 1963; and 645,280, filed on Mar. 16, 1964.

Dyes whose basic character is due to the presence of an external ammonium or cycloimmonium group, or which are derived from the Fischer base, are described, for example, in German Patents 1,011,396, filed on Dec. 29, 1955, and 1,044,026, filed on Dec. 14, 1955; and in German "Auslegeschrift" 1,045,969, filed on Feb. 8, 1956. Dyes containing aminoxide groups are described, for example, in Belgian Patent 586,634, filed on Jan. 15, 1960.

Heterocyclic compounds of aromatic character containing nitrogen can also be used, for example oxazole, thiazole, pyrrole, pyrazole, imidazole, thiodiazole, oxadiazole, 1,2,3- and 1,2,4-triazole, tetrazole pyridine piperidine, pyrrolidine, piperazine, morpholine, pyridazine, pyrazolidine, pyrazoline, pyrimidine and pyrazine compounds; if preferred these can be used in the form of condensed polycycles, for example a benzoxazole, benzthiazole, indole, indazole, benzimidazole, quinoline or isoquinoline cyclic system.

These dye salts, by virtue of their good solubility in organic solvents, are suitable for the coloration of high molecular materials, for example natural and synthetic resins, plastics, rubber, and solutions of these materials prepared for spinning or for use as surface coatings. The colorations obtained in these materials have excellent fastness to light, water, washing, perspiration, hydrosulphite, sublimation and fats.

In Example 5 of French Patent 1,227,024 the production of a dye salt is described wherein a 1:2 cobalt complex dye having in the metal-free form the formula

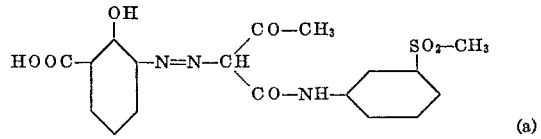

(a)

is reacted with "Rosinamine" D (dihydroabiethylamine). The resulting dye salt is suitable, among other uses, for the coloration of surface coatings and the spin dyeing of cellulose acetate.

For the purposes named above it is important that dyes or dye salts should be used which are well soluble in organic polar solvents and do not tend to crystallize in these solvents. In mechanical production methods good solubility is of great advantage because dye salts of low solubility often lead to interference in operation.

It was surprising to find that dye salts based upon an anionic metal complex dye corresponding in the metal-free form to Formula I and a nitrogen base should exhibit better solubility in organic polar solvents than the dye salt containing the metal complex dye which, in the metal-free form, corresponds to Formula $a$.

Especially good dye salts are, for example, those corresponding to the formula

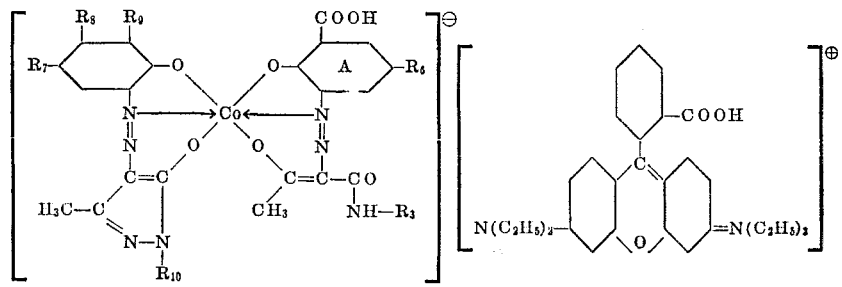

In the following examples the parts and percentages are by weight and the temperatures in degrees centigrade.

EXAMPLE 1

18 parts of the dye obtainable according to the particulars of Example 1 of French Patent 1,331,221, filed on Aug. 20, 1962, which contains cobalt in a complex bond, are dissolved with 2 parts of sodium hydroxide in 500 parts of water at 60°. A solution of 8.4 parts of Rhodamine B Extra (Colour Index No. 45170) and 10 parts of 30% hydrochloric acid in 300 parts of water is run into the first solution. A red precipitate forms immediately. After the acid reacting suspension has cooled, this is filtered off at pH 1–2, washed with water, dried and ground, upon which it is obtained as a red powder which is highly soluble on polar organic solvents, such as alcohol, ketones, acetic acid alkyl esters and ethers, ethyl alcohol, butyl alcohol acetone, cyclohexanone, ethyl acetate, amyl acetate, methyl glycol, ethyl glycol, diacetone alcohol and isophoron.

This product is suitable for the coloration of plastics and surface coatings, for example nitrocellulose and vinyl lacquers, in which it gives fiery red shades of good fastness to light, fats and top finishes. It can also be used for the coloration of fiber-forming materials in solution in organic solvents, for example cellulose acetate, polyesters or polyacrylonitrile, which are subsequently spun into filament.

The following table gives details of the structure of further dye salts. Column (I) gives the structural composition of the acid metal complex dye, column (II) the type of base used and column (III) the shade of the colorations obtained with the dye salts in vinyl lacquer. The figures in column (II) refer to the numbers in the Colour Index, second edition, 1956, under which the dye or base is described.

TABLE

| Ex. No. | (I) | (II) | (III) |
|---|---|---|---|
| 2 | 1:1 copper complex of Example 4 of French Patent 1,331,221. | Rhodamine B C.I. 45170 | Red. |
| 3 | 1:2 cobalt complex of Example 1 of French Patent 1,331,221. | Rhodamine 4GD C.I. 45160 | Red. |
| 4 | 1:2 chromium complex of Example 2 of French Patent 1,331,221. | Rhodamine B C.I. 45170 | Red. |
| 5 | 1:1 copper complex of Example 3 of French Patent 1,331,221. | do | Red. |
| 6 | 1:2 cobalt complex of 2-amino-1 hydroxy-4-nitrobenzene-6-carboxylic acid→1-acetoacetylamino-octane. | Dodecylamine | Yellow. |
| 7 | 1:1 copper complex of 2-amino-1-hydroxy-4-nitrobenzene-6-carboxylic acid→1-acetoacetylamino-octane. | Stearylamine | Do. |
| 8 | 1:2 chromium complex of 2-amino-1-hydroxy-4-nitrobenzene-6-carboxylic acid→1-acetoacetylamino-octane. | Dicyclohexylamine | Do. |
| 9 | 1:2 cobalt complex of 2-amino-1-hydroxy-4-nitrobenzene-6-sulphonic acid→1-acetoacetylamino-dodecane. | Di-o-tolyl-guanidine | Do. |
| 10 | 1:2 chromium complex of 2-amino-1-hydroxy-4-nitrobenzene-6-sulphonic acid→1-acetoacetylamino-dodecane. | Benzyl-isothiuroniumchloride | Do. |
| 11 | 1:2 cobalt complex of Example 11 of French Patent 1,331,221. | Auramine G C.I. 41005 | Do. |
| 12 | 1:2 cobalt complex of Example 11 of French Patent 1,331,221. | Malachite Green C.I. 42000 | Green. |
| 13 | 1:2 copper complex of Example 11 of French Patent 1,331,221. | Acridine Yellow G C.I. 46025 | Yellow. |
| 14 | 1:2 cobalt complex of Example 26 of French Patent 1,331,221. | Rhodamine B C.I. 45170 | Violet. |
| 15 | 1:2 cobalt complex of equimolar amounts of the acid dyes 2-amino-1-hydroxy-4-nitrobenzene-6-carboxylic acid→1-acetoacetyl-amino-2-ethyl-hexane and 2-amino-1-hydroxy-4-chloro-benzene→1-phenyl-3-methyl-5-pyrazolone. | do | Red. |
| 16 | 1:2 cobalt complex of equimolar amounts of the acid dyes 2-amino-1-hydroxy-4-nitrobenzene-6-carboxylic acid→1-acetoacetylamino-2-ethyl-hexane and 2-amino-1-hydroxy-4,6-di-chloro-benzene→1-phenyl-3-methyl-5-pyrazolone. | do | Red. |
| 17 | 1:2 cobalt complex of equimolar amounts of the acid dyes 2-amino-1-hydroxy-4-nitrobenzene-6-carboxylic acid→1-acetoacetylamino-2-ethyl-hexane and 2-amino-1-hydroxy-3,4,6-trichloro-benzene→1-phenyl-3-methyl-5-pyrazolone. | do | Red. |
| 18 | 1:2 cobalt complex of equimolar amounts of the acid dyes 2-amino-1-hydroxy-4-nitrobenzene-6-carboxylic acid→1-acetoacetylamino-2-ethyl-hexane and 2-amino-1-hydroxy-4-nitro-benzene→1-phenyl-3-methyl-5-pyrazolone. | do | Red. |
| 19 | 1:2 cobalt complex of equimolar amounts of the acid dyes 2-amino-1-hydroxy-4-nitrobenzene-6-carboxylic acid→1-acetoacetylamino-2-ethyl-hexane and 2-amino-1-hydroxy-5-nitro-benzene→1-phenyl-3-methyl-5-pyrazolone. | do | Blue-red. |
| 20 | 1:2 cobalt complex of equimolar amounts of the acid dyes 2-amino-1-hydroxy-4-nitrobenzene-6-carboxylic acid-1-acetoacetylamino-2-ethyl-hexane and 2-amino-1-hydroxy-4-nitro-6-chloro-benzene→1-phenyl-3-methyl-5-pyrazolone. | do | Red. |
| 21 | 1:2 cobalt complex of equimolar amounts of the acid dyes 2-amino-1-hydroxy-4-nitrobenzene-6-carboxylic acid→1-aceto-acetylamino-2-ethyl-hexane and 2-amino-1-hydroxy-4-nitro-benzene→1-acetoacetylamino-benzene. | do | Red. |
| 22 | do | $O_2N-\underset{Cl}{\bigcirc}-N=N-\underset{CH_3}{\bigcirc}-N\underset{C_2H_4-N(CH_3)_2}{\overset{C_2H_5}{\diagdown}}$ with $NH_2$ | Orange. |
| 23 | 1:2 chromium complex of equimolar amounts of the acid dyes 2-amino-1-hydroxybenzene-6-carboxylic acid→1-acetoacetylaminopentane and 2-amino-1-hydroxy-4-bromobenzene→1-(1'-naphthyl)-3-methyl-5-pyrazolone. | 3-methoxy-1-aminopropane | Orange-yellow. |
| 24 | 1:2 chromium complex of equimolar amounts of the acid dyes 2-amino-1-hydroxy-4-chlorobenzene-6-sulphonic acid→1-acetoacetyl-amino-dodecane and 2-amino-1-hydroxy-4,6-dibromo-benzene→3-methyl-5-pyrazolone. | The dye of Example 1 of German Patent 1,011,396 | Orange. |
| 25 | 1:2 cobalt complex of equimolar amounts of the acid dyes 2-amino-1-hydroxy-4-bromobenzene-6-carboxylic acid→1-acetoacetylaminotetradecane and 2-amino-1-methoxy-4,6-dinitrobenzene→1-(2'-tetrahydronaphthyl)-3-methyl-5-pyrazolone. | Zapon Fast Blue 3G C.I. 51005 | Olive. |
| 26 | 1:2 cobalt complex of equimolar amounts of the acid dyes 2-amino-1-hydroxy-4-methylbenzene-6-carboxylic acid→1-acetoacetyl-amino-decane and 2-amino-1-hydroxy-4-methoxy-benzene→1-iso-propyl-3-methyl-5-pyrazolone. | Astrazon Red 6B C.I. 48020 | Red. |
| 27 | 1:2 cobalt complex of equimolar amounts of the acid dyes 2-amino-1-hydroxy-4-tert. butylbenzene-6-carboxylic acid→1-acetoacetyl-amino-hexane and 2-amino-1-hydroxy-4-nitro-6-methylbenzene→1-(2',5'-dichloro)-phenyl-3-methyl-5-pyrazolone. | Thioflavine C.I. 49005 | Yellow. |

TABLE—Continued

| Ex. No. | (I) | (II) | (III) |
|---|---|---|---|
| 28 | 1:2 cobalt complex of equimolar amounts of the acid dyes 2-amino-1-hydroxy-4-chlorobenzene-6-carboxylic acid→1-acetoacetyl-amino-octane and 2-amino-1-hydroxy-benzene-4-methyl-sulphone→1-(3'-cyanophenyl)-3-methyl-5-pyrazolone. | Chrysoidine GS C.I. 11270 | Orange. |
| 29 | 1:2 chromium complex of Example 22 of French Patent 1,331,221. | Astrazon Yellow 5G C.I. 48065 | Yellow. |
| 30 | 1:2 chromium complex of Example 24 of French Patent 1,331,221. | Methyl Violet B C.I. 42535 | Black. |
| 31 | 1:2 cobalt complex of Example 26 of French Patent 1,331,221. | Safranine T C.I. 50240 | Red. |
| 32 | 1:2 cobalt complex of Example 27 of French Patent 1,331,221. | Astrazon Blue G C.I. 42025 | Green. |
| 33 | 1:2 cobalt complex of Example 28 of French Patent 1,331,221. | Methyl Violet B C.I. 42535 | Black. |
| 34 | 1:2 cobalt complex of Example 29 of French Patent 1,331,221. | 1-amino-2-ethylhexane | Yellow. |
| 35 | 1:2 chromium complex of equimolar amounts of the acid dyes 2-amino-1-hydroxy-benzene-6-carboxylic acid→1-acetoacetylaminoundecane and 2-amino-1-hydroxy-4-nitro-benzene-→4-tert.butyl-1-hydroxy-benzene. | 1-amino-2-hydroxy-propane | Light brown. |
| 36 | 1:2 cobalt complex of equimolar amounts of the acid dyes 2-amino-1-hydroxy-4-nitrobenzene-6-carboxylic acid→1-acetoacetylamino-hexane and 2-amino-1-hydroxy-4-chlorobenzene 1,3-diaminobenzene. | Benzylmorpholine | Do. |

Application Example A.—A solution is prepared of 20 parts of vinyl chloride/vinyl acetate copolymer, for example "Vinylite" VMCH (registered trademark of Union Carbide Ltd.), 70 parts of methyl ethyl ketone and 10 parts of ethylene glycol. To this is added a solution of 0.5 part of the dye obtained in accordance with Example 1 in 10 parts of the identical lacquer solution. The pigmented lacquer is diluted with 25 parts of a 1:1 solution of methyl ethyl ketone and cyclohexane, cast on aluminium sheeting and air dried. The coating has a bright fiery red shade and shows good adhesibility with good fastness to wet rubbing, fats and top finishes and excellent fastness to light.

Application Example B.—100 parts of cellulose acetate containing 54–55% of cleavable acetic acid are mixed with 300 parts of solvent, for example a mixture of 275 parts of acetone and 25 parts of methanol; and after being well stirred, the solution is left overnight to swell. Next day 1 part of the dye obtained according to Example 1 is dissolved in 60 parts of the same solvent and this solution is added to the cellulose acetate solution with continued stirring until 60 parts of the solvent have evaporated. The solution is filtered through cotton and a cotton wool filter press and spun in the same way as undyed cellulose acetate. The resulting filament is dyed in a fiery red shade.

Formulae of the representative dyes of the foregoing examples are as follows:

Example 1:

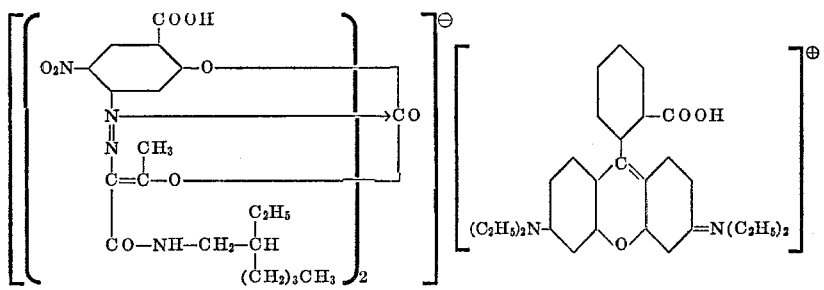

Example 15:

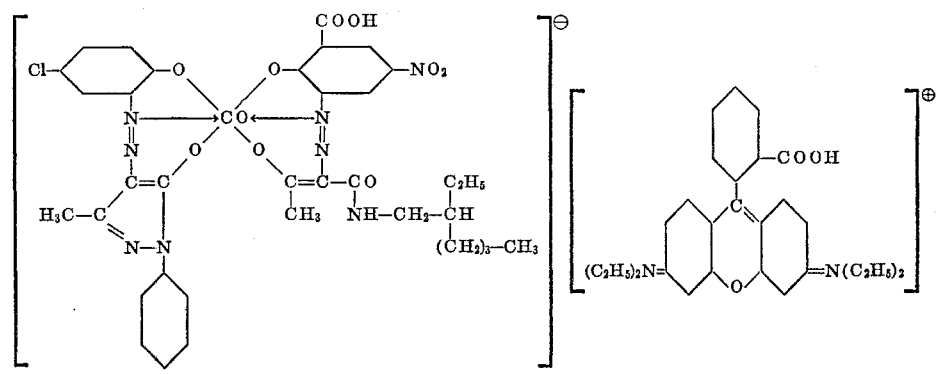

Example 16:
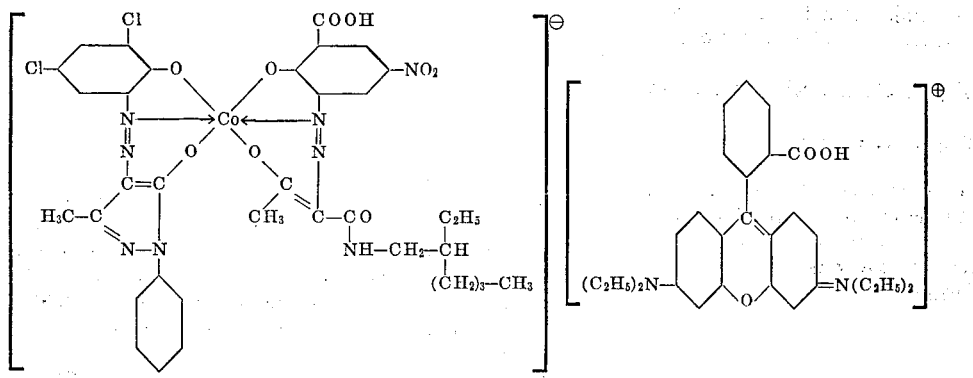
Example 18:
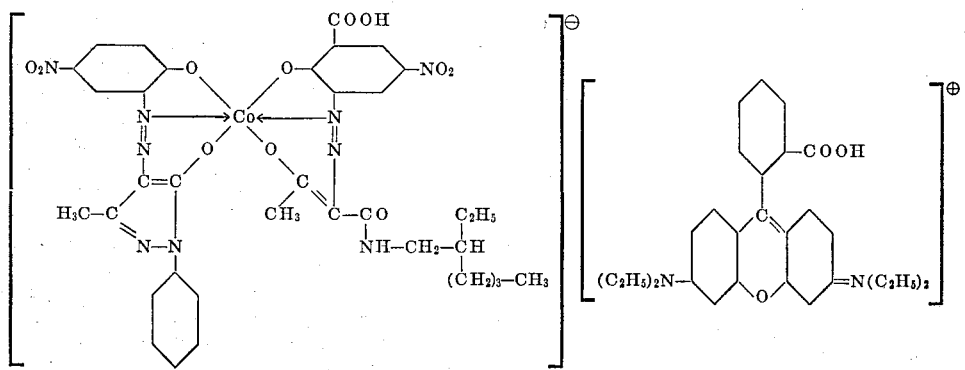
Example 19:
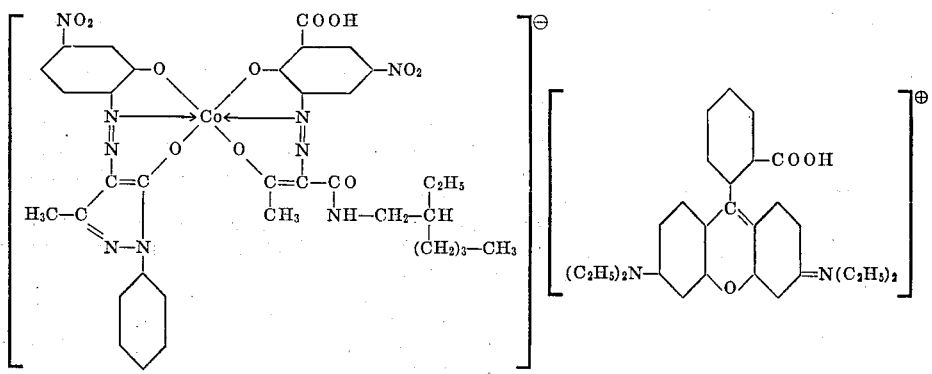
Example 20:
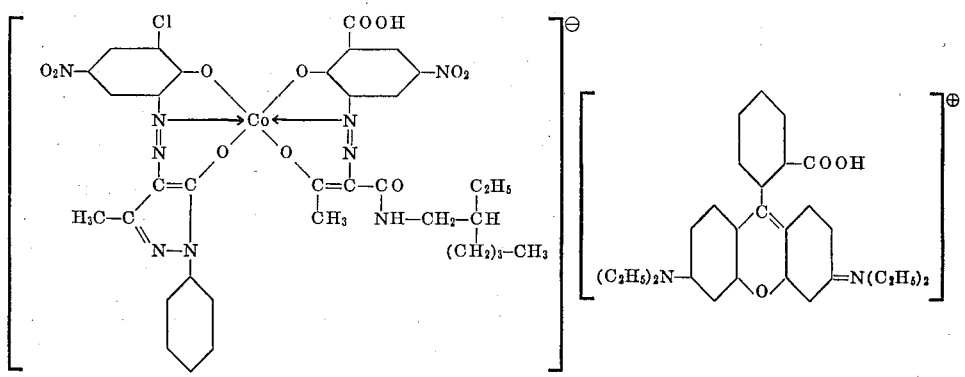

Having thus disclosed the invention what I claim is:

1. An anionic metal complex dye organic amine nitrogen base salt, the dye of which is a benzene-azo-acetoacetyl-alkyl amide dye wherein the alkyl has from 5 to 14 carbon atoms.

2. A dye salt according to claim 1 wherein the nitrogen base is colorless.

3. A dye salt according to claim 1 wherein the nitrogen base is colored.

4. A dye salt according to claim 1 consisting of a member selected from the group consisting of (a) a 1:1 chromium, 1:1 copper and 1:1 nickel and a 1:2 chromium and 1:2 cobalt complex dye which is based upon a metal free dye of the formula

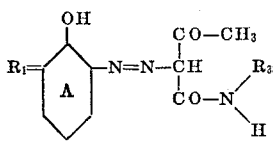

wherein:
$R_1$ is a member selected from the group consisting of a carboxylic and a sulfonic acid group;
$R_3$ is a member selected from the group consisting of an alkyl radical having 5 to 14 carbon atoms;
nucleus A is otherwise either unsubstituted or substituted, any substituent being selected from the group consisting of chloro, bromo, fluoro, nitro, cyano, trifluoromethyl, alkyl radicals having 1 to 5 carbon atoms, alkoxy radicals having 1 to 5 carbon atoms, lower alkylsulfonyl, phenyl and lower alkanoylamino; and
(b) a nitrogen base selected from the group consisting of a primary and secondary aliphatic amine having 4 to 18 carbon atoms; basic dye containing a hydrazinium, ammonium or cycloimmonium group; dye of the acridine, auramine, rhodamine, malachite green or triphenylmethane series and a heterocyclic compound of aromatic character.

5. A dye salt according to claim 4 wherein (a) consists of a member selected from the group consisting of a 1:2 chromium and 1:2 cobalt complex dye of the formula

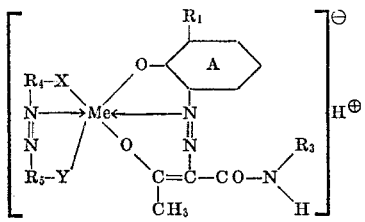

wherein:
X is a member selected from the group consisting of —O— and —COO—;

Y is a member selected from the group consisting of —O—, —COO—, —NH— and

R is a phenyl radical;
$R_4$ is the radical of a diazo compound of the benzene series, having X in ortho-position to the azo group;
$R_5$ is the radical of a coupling component having Y in ortho-position to the azo group and being selected from the groups consisting of the benzene, naphthalene, pyrazolone, aminopyrazol and acetoacetylamide series; and
Me is a member selected from the group consisting of chromium and cobalt.

6. A dye salt according to claim 1 wherein the anionic metal complex is a member selected from the group consisting of a 1:1 chromium complex, a 1:1 copper complex a 1:1 nickel complex, a 1:2 chromium complex and a 1:2 cobalt complex, based upon a dye, in metal-free form, which is a 2-amino-1-$R_2$-benzene-6-$R_1$→1-acetoacetyl-amino-alkane, wherein $R_1$ is a member selected from the group consisting of a carboxylic and a sulfonic acid group, $R_2$ is a substituent capable of metal complex formation, the alkane has from 5 to 14 carbon atoms and the benzene nucleus is free from further dissociating substituents.

7. A dye salt according to claim 1 wherein the dye is a 1:2 metal complex of (a) one mol of a 2-amino-1-$R_2$-benzene-6-$R_1$→1-acetoacetylaminoalkane, wherein $R_1$ is a member selected from the group consisting of a carboxylic and a sulfonic acid group, $R_2$ is a substituent capable of metal complex formation, the alkane has from 5 to 14 carbon atoms and the benzene nucleus is free from further dissociating substituents; (b) one mol of another metallizable azo dye; and (c) one atom of a metal selected from the group consisting of chromium and cobalt.

8. A dye salt according to claim 7 wherein at most one metal complex forming substituent is an amino substituent and that substituent is in the other metallizable azo dye.

9. A dye salt according to claim 6 wherein the dye is a 1:2 metal complex of 1 atom of metal selected from the group consisting of chromium and cobalt and two mols of the same dye.

10. A dye salt according to claim 9 wherein each metal linkage formed by a metal complex forming substituent is an —O— bridge.

11. A dye salt according to claim 6 wherein the nitrogen base is a member selected from the group consisting of a primary or secondary aliphatic amine having from 4 to 18 carbon atoms.

12. A dye salt according to claim 6 wherein the nitrogen base is a heterocyclic nitrogen-containing compound of aromatic character selected from the group consisting of an oxazole, a thiazole, a pyrrole, a pyrazole, an imidazole, a thiodiazole, an oxadiazole, a 1,2,3-triazole, a 1,2,4-triazole, a tetrazole, a pyridine, a piperidine, a pyrrolidine, a piperazine, a morpholine, a pyridazine, a pyrazolidine, a pyrazoline, a pyrimidine, a pyrazine, a benzoxazole, a benzthiazole, an indole, an indazole, a benzimidazole, a quinoline and an isoquinoline.

13. A dye salt according to claim 6 wherein the nitrogen base is a basic dye containing a member selected from the group consisting of a hydrazinium, an ammonium, a cycloimmonium and an aminoxide group.

14. A dye salt according to claim 6 wherein the nitrogen base is a basic dye selected from the group consisting of an acridine, an auramine, a rhodamine and a triphenylmethane.

15. A dye salt according to claim 14 wherein the nitrogen base is a rhodamine.

16. Dye salts according to claim 1 of the formula

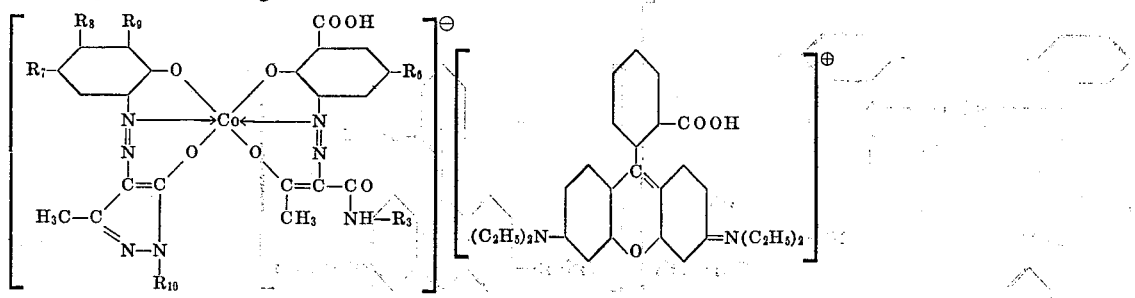

wherein:

$R_3$ is a member selected from the group consisting of a substituted and unsubstituted alkyl radical having 5 to 14 carbon atoms, $R_6$ is a member selected from the group consisting of hydrogen, substituted and unsubstituted alkyl, chlorine, bromine and nitro, $R_7$ is a member selected from the group consisting of hydrogen, substituted and unsubstituted alkyl, alkoxy, chlorine, bromine and nitro, $R_8$ is a member selected from the group consisting of hydrogen and nitro, $R_9$ is a member selected from the group consisting of hydrogen, substituted and unsubstituted alkyl, chlorine and bromine, and $R_{10}$ is a member selected from the group consisting of hydrogen, substituted and unsubstituted alkyl and aryl.

17. The dye salt of the formula

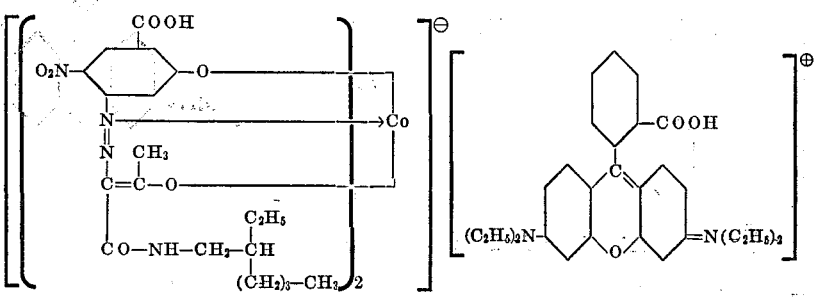

18. The dye salt of the formula

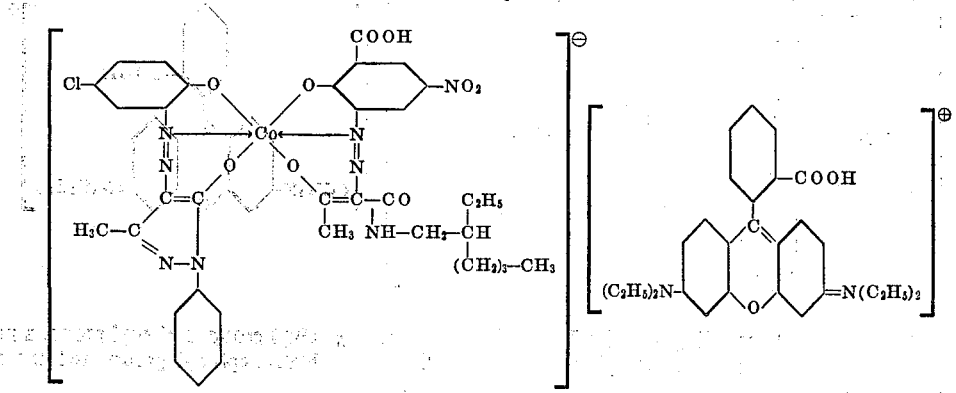

19. The dye salt of the formula

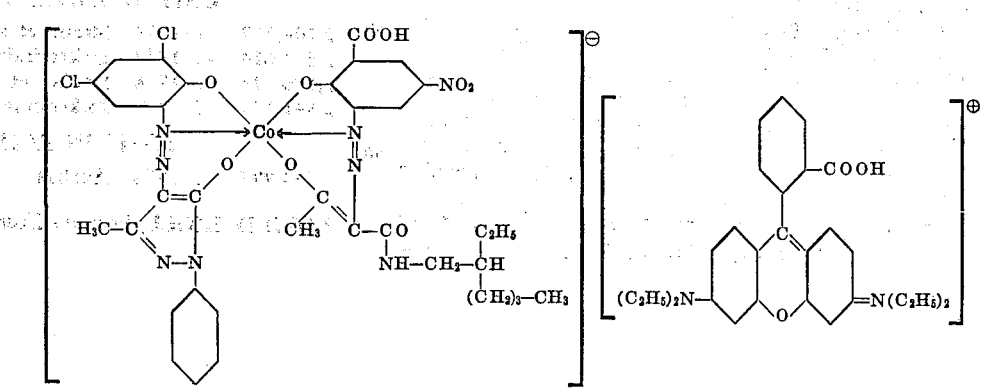

20. The dye salt of the formula

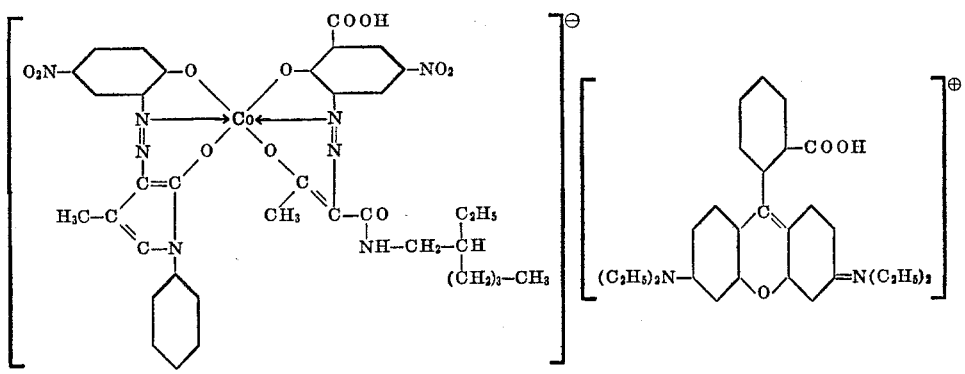

21. The dye salt of the formula

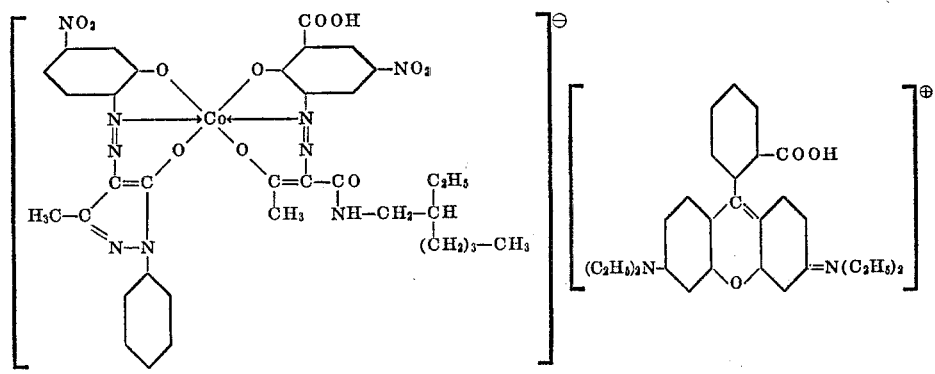

22. The dye salt of the formula

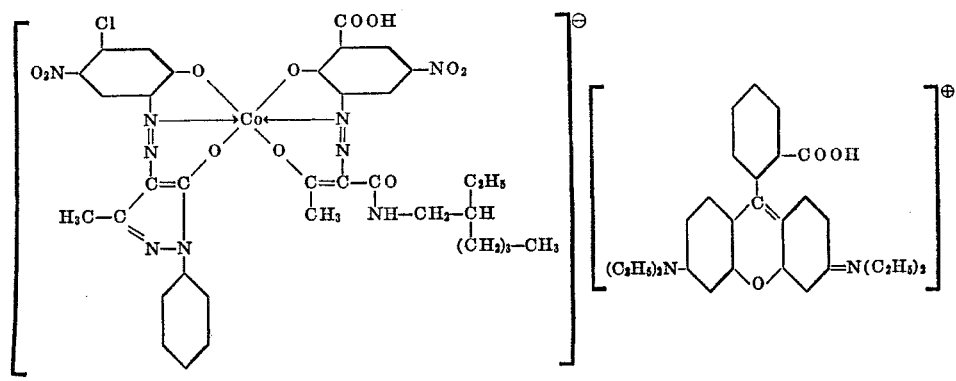

23. A dye salt according to claim 7 wherein each metal linkage formed by a metal complex forming substituent is an —O— bridge; the 4-position of the benzene nucleus of component (a) bears a member selected from the group consisting of hydrogen, chloro, bromo, nitro and a lower alkyl group; $R_1$ is the carboxylic acid group; the other metallizable azo dye is a 2-amino-4-$R_7$-5-$R_8$-6-$R_9$-1-hydroxybenzene→1-$R_{10}$-3-methyl-5-pyrazolone, wherein $R_7$ is a member selected from the group consisting of hydrogen, chloro, bromo, nitro, a lower alkyl group and a lower alkoxy group, $R_8$ is a member selected from the group consisting of hydrogen and nitro, $R_9$ is a member selected from the group consisting of hydrogen, chloro, bromo and a lower alkyl group, and $R_{10}$ is a member selected from the group consisting of hydrogen, a lower alkyl group, a phenyl group, a naphthyl group and a tetrahydronaphthyl group; and the metal is cobalt.

References Cited

UNITED STATES PATENTS

| | | | |
|---|---|---|---|
| 2,104,357 | 1/1938 | Straub et al. | 260—145 |
| 2,814,614 | 11/1957 | Zickendraht | 260—145 |
| 2,826,573 | 3/1958 | Strobel et al. | 260—147 |
| 2,841,576 | 7/1958 | Zickendraht et al. | 260—145 |

FOREIGN PATENTS

| | | |
|---|---|---|
| 194,999 | 1/1958 | Austria. |

FLOYD D. HIGEL, *Primary Examiner.*

UNITED STATES PATENT OFFICE
CERTIFICATE OF CORRECTION

Patent No. 3,406,164                                                   October 15, 1968

Ruedi Altermatt et al.

It is certified that error appears in the above identified patent and that said Letters Patent are hereby corrected as shown below:

Columns 9 and 10, in the table, sixth column, opposite Example 51, "NHCOCO$_3$" should read -- NHCOCH$_3$ --. Columns 11 and 12, in the table, fifth column, opposite Example 96, "CH$_3$CH$_2$OCOC should read -- CH$_2$CH$_2$OCOCH$_3$ --. Columns 17 and 18, in the table sixth column, opposite Example 269, "COH$_2$CH$_3$" should read -- OCH$_2$CH$_3$ --. Column 22, line 50, "haloalkoxycarbonylalkyl," should read -- haloalkoxycarbonyloxyalkyl, --. Column 23, line 47, "methoxylacetylamino," should read -- methoxyacetylamino, --. Column 24, lines 70 to 75, the lower right-hand of the formula reading "CH$_2$CH$_2$OCOC" should read -- CH$_2$CH$_2$OCOCH$_3$ --.

Signed and sealed this 10th day of March 1970.

(SEAL)
Attest:

EDWARD M. FLETCHER, JR.                              WILLIAM E. SCHUYLER, JR.
Attesting Officer                                              Commissioner of Patents